US009980007B1

(12) United States Patent
Thompson et al.

(10) Patent No.: US 9,980,007 B1
(45) Date of Patent: May 22, 2018

(54) GENERATING AND DYNAMICALLY UPDATING A PERSONALIZED PROGRAMMING GUIDE

(71) Applicant: Cox Communications, Inc., Atlanta, GA (US)

(72) Inventors: Catherine Elizabeth Thompson, Roswell, GA (US); Katy Kozee, Atlanta, GA (US); Thomas G. Holzman, Marietta, GA (US); Anant Patil, Marietta, GA (US)

(73) Assignee: Cox Communications, Inc., Atlanta, GA (US)

(*) Notice: Subject to any disclaimer, the term of this patent is extended or adjusted under 35 U.S.C. 154(b) by 0 days. days.

(21) Appl. No.: 14/216,469

(22) Filed: Mar. 17, 2014

Related U.S. Application Data

(60) Provisional application No. 61/794,434, filed on Mar. 15, 2013, provisional application No. 61/801,555, filed on Mar. 15, 2013, provisional application No. 61/800,968, filed on Mar. 15, 2013.

(51) Int. Cl.
*H04N 21/475* (2011.01)
*H04N 21/442* (2011.01)

(52) U.S. Cl.
CPC ... *H04N 21/4756* (2013.01); *H04N 21/44222* (2013.01)

(58) Field of Classification Search
CPC .................... H04N 21/4756; H04N 21/44222
USPC ..................................... 725/37–56; 348/565
See application file for complete search history.

(56) References Cited

U.S. PATENT DOCUMENTS

| 7,117,440 | B2 | 10/2006 | Gordon et al. |
| 7,174,512 | B2 | 2/2007 | Martin et al. |
| 7,185,355 | B1* | 2/2007 | Ellis .................. H04N 5/44543 |
| | | | 348/E5.105 |
| 7,231,607 | B2 | 6/2007 | Neely |
| 7,757,252 | B1 | 7/2010 | Agasse |
| 7,900,228 | B2 | 3/2011 | Stark et al. |

(Continued)

OTHER PUBLICATIONS

U.S. Appl. No. 14/213,998, filed Mar. 14, 2014 entitled "Customized Mosaic Screen".

(Continued)

*Primary Examiner* — Nathan Flynn
*Assistant Examiner* — Caroline Somera
(74) *Attorney, Agent, or Firm* — Merchant & Gould P.C.

(57) ABSTRACT

Generating and dynamically updating a personalized programming guide is provided. Personalized information associated with a user's viewing activity and interaction with a programming guide may be collected and communicated with a server. The server may share the personalized information with a database, which may process the information to identify one or more most watched channels and to determine recommendations for the user. Additional personalized settings may be collected, processed, and utilized to filter recommendations and relevant content. Recommendations and content tied to the user's favorite channels, most watched channels, and user-specified or automatically recognized genres and themes may be provided to the user via a client device or application. The user may access the personalized programming guide via a variety of client devices via various communication mechanisms.

18 Claims, 8 Drawing Sheets

(56) References Cited

U.S. PATENT DOCUMENTS

| | | | |
|---|---|---|---|
| 8,132,208 B2 | 3/2012 | Gonzalez | |
| 8,789,126 B1 | 7/2014 | Nijim et al. | |
| 8,856,847 B2 | 10/2014 | Soroushian | |
| 8,930,999 B1* | 1/2015 | Maeng | 725/41 |
| 8,997,151 B2 | 3/2015 | Chai et al. | |
| 2002/0075408 A1* | 6/2002 | Curreri | H04N 5/50 348/569 |
| 2003/0093792 A1* | 5/2003 | Labeeb et al. | 725/46 |
| 2003/0115589 A1* | 6/2003 | D'Souza et al. | 725/10 |
| 2004/0268403 A1* | 12/2004 | Krieger | H04N 5/44543 725/112 |
| 2006/0107302 A1 | 5/2006 | Zdepski | |
| 2006/0174269 A1* | 8/2006 | Hansen-Turton | 725/39 |
| 2007/0011702 A1 | 1/2007 | Vaysman | |
| 2007/0204302 A1 | 8/2007 | Calzone | |
| 2007/0234388 A1 | 10/2007 | King | |
| 2007/0250865 A1 | 10/2007 | Krakirian | |
| 2007/0266403 A1* | 11/2007 | Ou et al. | 725/46 |
| 2008/0060006 A1 | 3/2008 | Shanks et al. | |
| 2008/0066103 A1 | 3/2008 | Ellis et al. | |
| 2008/0155600 A1 | 6/2008 | Klappert et al. | |
| 2008/0235730 A1* | 9/2008 | Guillorit | 725/44 |
| 2009/0070809 A1* | 3/2009 | Kendall et al. | 725/39 |
| 2009/0070812 A1* | 3/2009 | Sasaki | H04N 5/44543 725/39 |
| 2009/0228943 A1 | 9/2009 | Ramaswamy et al. | |
| 2010/0131983 A1 | 5/2010 | Shannon et al. | |
| 2010/0262995 A1 | 10/2010 | Woods et al. | |
| 2011/0072463 A1 | 3/2011 | Zaslavsky | |
| 2011/0173664 A1* | 7/2011 | Knudson | 725/46 |
| 2011/0283325 A1 | 11/2011 | Tomita | |
| 2011/0307925 A1 | 12/2011 | Vaysman et al. | |
| 2012/0011544 A1 | 1/2012 | Vaysman et al. | |
| 2012/0054803 A1* | 3/2012 | Lee | H04N 21/4755 725/56 |
| 2012/0131603 A1* | 5/2012 | Williamson et al. | 725/25 |
| 2012/0192218 A1* | 7/2012 | Schwesinger | H04H 60/33 725/21 |
| 2013/0067519 A1 | 3/2013 | Yates | |
| 2013/0347038 A1 | 12/2013 | Lee | |
| 2014/0047467 A1* | 2/2014 | Arling et al. | 725/14 |
| 2014/0089980 A1* | 3/2014 | Alexander | H04N 5/44543 725/42 |
| 2014/0282734 A1 | 9/2014 | Stern | |
| 2015/0095927 A1 | 4/2015 | NaikRaikar | |
| 2015/0237390 A1 | 8/2015 | Watters | |

OTHER PUBLICATIONS

U.S. Appl. No. 14/214,090, filed Mar. 14, 2014 entitled "Personalized Mosaic Integrated With the Guide".

U.S. Appl. No. 14/214,192, filed Mar. 14, 2014 entitled "Automatic Population of a Mosaic Screen".

U.S. Official Action dated May 28, 2015 in U.S. Appl. No. 14/214,090, 23 pgs.

U.S. Official Action dated Jun. 5, 2015 in U.S. Appl. No. 14/214,192, 29 pgs.

U.S. Official Action dated Jun. 17, 2015 in U.S. Appl. No. 14/213,998, 30 pgs.

U.S. Official Action dated Jan. 4, 2016 in U.S. Appl. No. 14/214,192, 21 pgs.

Notice of Allowance dated Dec. 15, 2015 in U.S. Appl. No. 14/214,090, 22 pgs.

U.S. Appl. No. 14/213,998, Notice of Allowance dated Mar. 1, 2016, 18 pgs.

U.S. Official Action dated Mar. 23, 2017, in U.S. Appl. No. 14/214,192, 21 pgs.

U.S. Official Action dated Sep. 9, 2016, in U.S. Appl. No. 14/214,192, 27 pgs.

\* cited by examiner

GENERATING AND DYNAMICALLY UPDATING A PERSONALIZED PROGRAMMING GUIDE

CROSS-REFERENCE TO RELATED APPLICATIONS

The application claims priority to U.S. Provisional Patent Application No. 61/794,434 titled "Automatic Population of a Mosaic Screen" filed Mar. 15, 2013, U.S. Provisional Patent Application No. 61/801,555 titled "Personalized Mosaics Integrated with the Guide" filed Mar. 15, 2013, and U.S. Provisional Patent Application No. 61/800,968 titled "Customized Mosaic Screen" filed Mar. 15, 2013, the disclosures of which are hereby incorporated by reference in their entireties.

BACKGROUND

With the vast amount of media content available for viewing, browsing through channels or through a programming guide to select what to view from the large amount of available content can be tedious. A user typically watches a select number of channels that provide media content matching his/her viewing tastes. To help find relevant content or content that the user may like, many media service providers provide a favorite channels functionality that allows users to manually add one or more channels to a favorite channels list. Instead of having to navigate through an entire channel lineup to find content on his/her favorite channels, a user may be able to access his/her favorite channels list to navigate to a channel he/she selected as a favorite channel. If the user no longer wants a certain channel on his/her favorite channels list, he may manually remove the channel from the list.

Many programming guides today allow for filtering content to a specific genre; however, current programming guides do not provide a personalized guide experience where a user's viewing patterns may be automatically recognized and where content may be dynamically included in a personalized programming guide based on his/her viewing patterns (e.g., automatically generated favorite channels). Additionally, current guides do not provide for identifying and incorporating a theme associated with video content a user typically watches. It is with respect to these and other considerations that the present invention has been made.

SUMMARY

Embodiments of the present invention provide for generating and dynamically updating a personalized programming guide. Personalized information associated with a user's viewing activity and interaction with a programming guide may be collected and communicated with a server. The server may share the personalized information with a database, which may process the information to identify one or more most watched channels and to determine recommendations for the user. The user may actively specify additional personalized settings and/or personalized settings may be automatically determined from the user's viewing activity and interaction with the programming guide. The additional personalized settings may be processed and may be utilized to filter recommendations and relevant content. Recommendations and content tied to the user's favorite channels, most watched channels, and user-specified or automatically recognized genres and themes may be provided to the user via a client device or application. The user may access the personalized programming guide via a variety of client devices via various communication mechanisms.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout the several figures.

DETAILED DESCRIPTION

As briefly described above, embodiments of the present invention provide for generation and dynamic updating of a personalized programming guide. Personalized information associated with a user's viewing activity and interaction with a programming guide may be collected and communicated with a server. The server may share the personalized information with a database which may process the information to identify one or more most watched channels and to determine recommendations for the user. Additional personalized settings may be collected, processed, and utilized to filter recommendations and relevant content. Recommendations and content tied to the user's favorite channels, most watched channels, and user-specified or automatically recognized genres and themes may be provided to the user via a client device or application. The user may access the personalized programming guide via a variety of client devices via various communication mechanisms.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
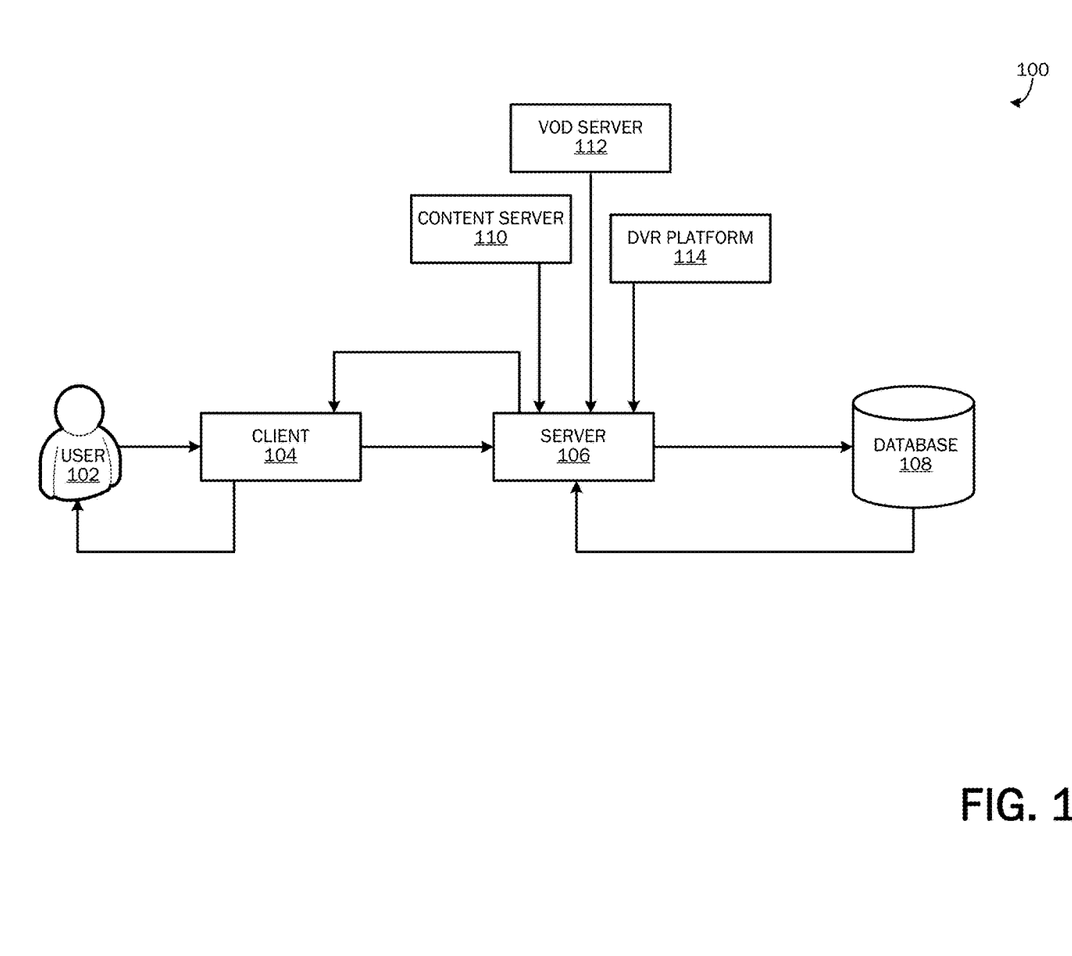
FIG. 1 is a simplified block diagram of an exemplary system for generating and dynamically updating a personalized programming guide.

FIG. 1 is a simplified block diagram of a system 100 for generating and dynamically updating a personalized guide. Components of the system 100 may operate as a distributed system where each component is accessed via a suitable network, or the components may operate together as an integrated system. The system may be illustrative of various types of service systems, for example, a cable television service system, a satellite-based television service system, an Internet protocol-based service system, or any other service provider system that is operable to provide audio, video, or a combination of audio and video content to users/subscribers for consumption via a variety of receiving devices. A detailed illustration and description of an example cable television services provider system is provided below with reference to FIG. 7.

As illustrated, the system 100 may comprise a client 104, wherein the client 104 may be a television client, a mobile client, or a web-based client. The client 104 may comprise a client application running on a television, such as a network-connected television, on a set top box (STB), on a mobile communication device, or on a computing device, such as a desktop computer, a laptop computer, a tablet computing device, etc. The client 104 may be operable to collect personalized information from and on behalf of a user 102. For example, personalized information may include information such as which channels and programs the user 102 is watching. Personalized information may also include information such as what day of the week the user 102 is watching a certain channel or program, what time of the day the user 102 is watching a certain channel or program, and the type of client device the user 102 is using. The client 104 may be further operable to send the collected personalized information to a server 106, with which the client 104 may be in continual communication.

The server 106 may include one or more servers, and may be centrally or locally located. The server 106 may be operable to receive the personalized information provided by the client 104 and share the personalized information with a database 108. The server 106 may also be operable to receive data from one or more of a content server 110, a video on demand (VOD) server 112, and a digital video recorder (DVR) platform 114.

A content server 110 may be operable to store video content data and metadata available via a media service provider, such as cable television (CATV) services system (as illustrated and described below with reference to FIG. 7), satellite television provider, or a web-based media content provider such as YouTube®, Hulu®, etc. The data and metadata may include information associated with video content items, such as content titles, cast, storyline, content release date, content ratings, information describing content plots, summaries, images, mood, or any other information that may be provided in association with a given content item.

A VOD server 112 may provide access to various VOD media content items which may be stored in a VOD library maintained by the media service provider or to third party VOD media content items that may be available via the Internet. A DVR platform 114 may include a client DVR (e.g., integrated with a STB in communication with a television) or a network DVR, which may comprise various DVR recordings or pointers to various DVR recordings that may be available for viewing to the user.

The server 106 may share data received from the content server 110, the VOD server 112, and/or the DVR platform 114 with the database 108. The database 108 may process the personalized information and identify the user's most watched channels. The identified most watched channels for the user 102 may be automatically included in a favorite channels list for the user. Additionally, the database 108 may store the data received from the content server 110, the VOD server 112, and/or the DVR platform 114. The data may be utilized in conjunction with the personalized information to determine one or more VOD, DVR, and linear content recommendations for the user 102. The database 108 may be further operable to persist the personalized information and the profile enhancement data (i.e., the user's most watched channels and the one or more recommendations for the user 102).

Further, the database 108 may be operable to determine a power-on channel for the user 102, wherein the power-on channel is the channel that is first displayed when the user 102 turns on his television or other client viewing device. According to an embodiment, the user's most watched channel may be selected as the power-on channel. According to another embodiment, a channel currently airing content matching a certain theme (as will be described below) may be selected as the power-on channel. Selection of the power-on channel may be day-based and/or time-based. For example, the user's viewing activity may indicate that the user typically watches news programming on weekday mornings. If the user 102 powers on his television on a Tuesday morning, the client 104 may automatically tune to a news channel or to a newscast airing on another type of channel. The user 102 may specify personalized settings for his/her power-on channel. For example, the user 102 may wish for his/her power-on channel to be his most-watched channel, a specific channel, a channel airing a certain type or theme of content, or a last channel watched.

The server 106 may provide the client 104 with VOD, DVR, and linear content recommendations and content tied to the user's automatically identified favorite channels, as well as a determined power-on channel. According to one embodiment, the user 102 may be prompted to specify additional personalized settings. According to another embodiment, additional personalized settings may be automatically identified via analysis of the user's viewing activity data. Personalized settings may include, but are not limited to, preferred genres, preferred themes, favorite channels, power-on channel preferences, and other personalized settings. Any preferences specified by the user 102 may be received by the client 104 and communicated with the server 106. The server 106 may then share the user-specified preferences with the database 108. Automatically identified preferences may be identified by the database 108. The database 108 may process the user-specified preferences and/or the automatically identified preferences to filter the one or more recommendations and relevant content. The server 106 may provide the client 104 with recommendations, content tied to the user's favorite channels, most-watched channels, specified or identified genres, specified or identified themes, and a power-on channel. The recommendations, content tied to the user's favorite channels, most-watched channels, specified or identified genres, and specified or identified themes may be provided to the client 104 for display in the user's personalized programming guide. According to an embodiment, the displayed recommendations may be dependent on such factors as the day of the week, the time of the day, and/or the client device the user 102 is using.

As can be appreciated, typically when a user 102 uses a programming guide to search content to view, he/she may have a specific idea of the kind of content or a characteristic of the content that he wants to watch. The user 102 may not have a specific television show or movie in mind or know that a particular television show or movie is currently available, but he/she may know of a characteristic of the content with which to filter the available programming for matches of the type of content the user 102 typically watches. For example, the user 102 may enjoy watching award-winning shows, shows about zombies, shows about vampires, shows about fishing, and shows about college life. The characteristics by which content may be filtered may be herein referred to as "themes," which may be more specific to a user 102 than a genre (e.g., comedy, romance, sports, documentary, high-definition (HD) content, etc.).

The user 102 may be able to select one or more themes as a personalized setting by which available programming may be filtered. Additionally, the system may be operable to automatically detect a theme from an analysis of the user's 102 viewing activity. According to one embodiment, the user 102 may be prompted to add the detected theme as a personalized setting for his/her personalized programming guide. According to another embodiment, a detected theme may be automatically added as a personalized setting for the user's personalized programming guide.

Figure 2:
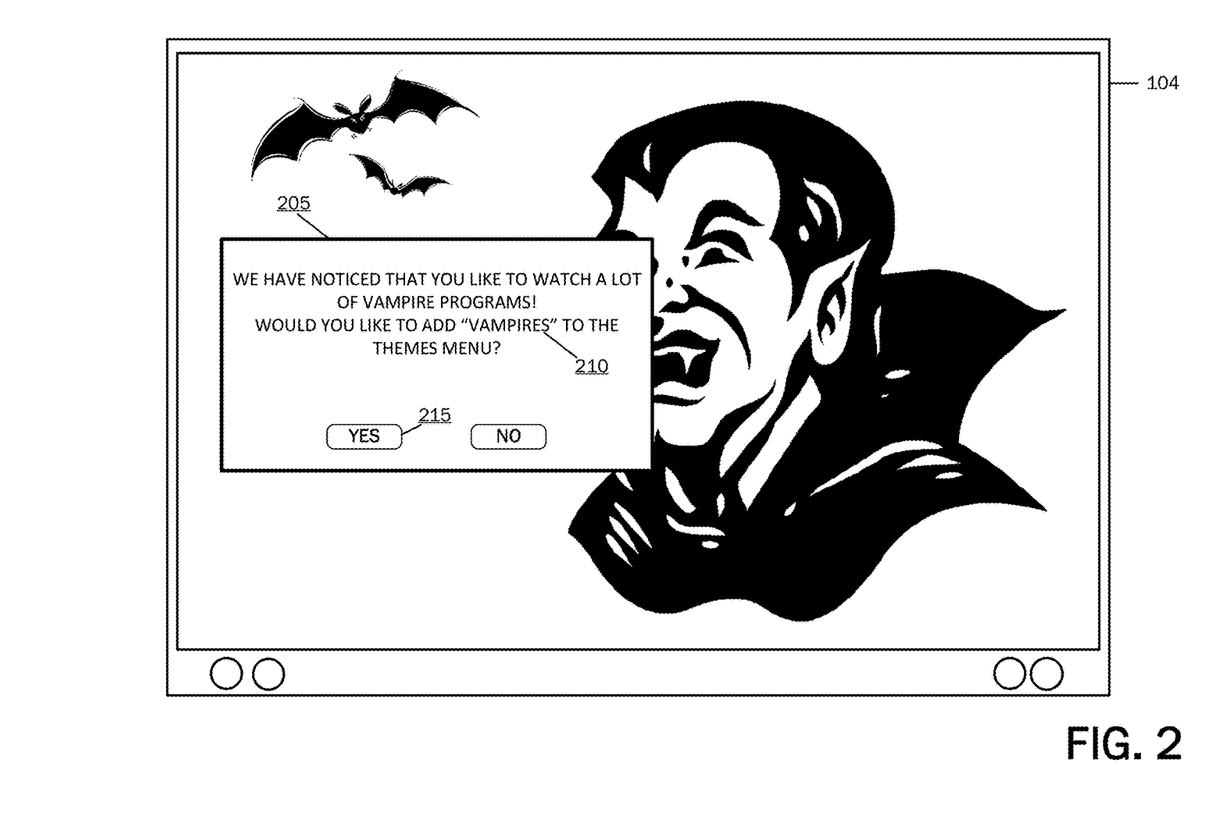
FIG. 2 is an illustration of notification of an identified theme.

FIG. 2 is an illustration of an example notification 205 displayed on a client device 104 notifying a user 102 of a detected theme 210 and providing a selective option 215 to add the detected theme 210 to the user's personalized settings. For example, a user 102 may start viewing content related to a theme 210 such as vampires. The user may not have manually selected to add the vampires theme to his/her personalized settings. The system may identify the frequently watched theme 210 and prompt the user to add the identified theme 210 to his/her personalized settings. Upon selection of an affirmative selective option 215, the theme 210 may be added to the user's personalized settings which may be used by the database 108 to filter the one or more recommendations and relevant content. As described above, a detected theme may be automatically added as a personalized setting for the user's personalized programming guide, and use the automatically detected and added theme for content filtering. That is, a detected them may be added without user interaction.

Figure 3A:
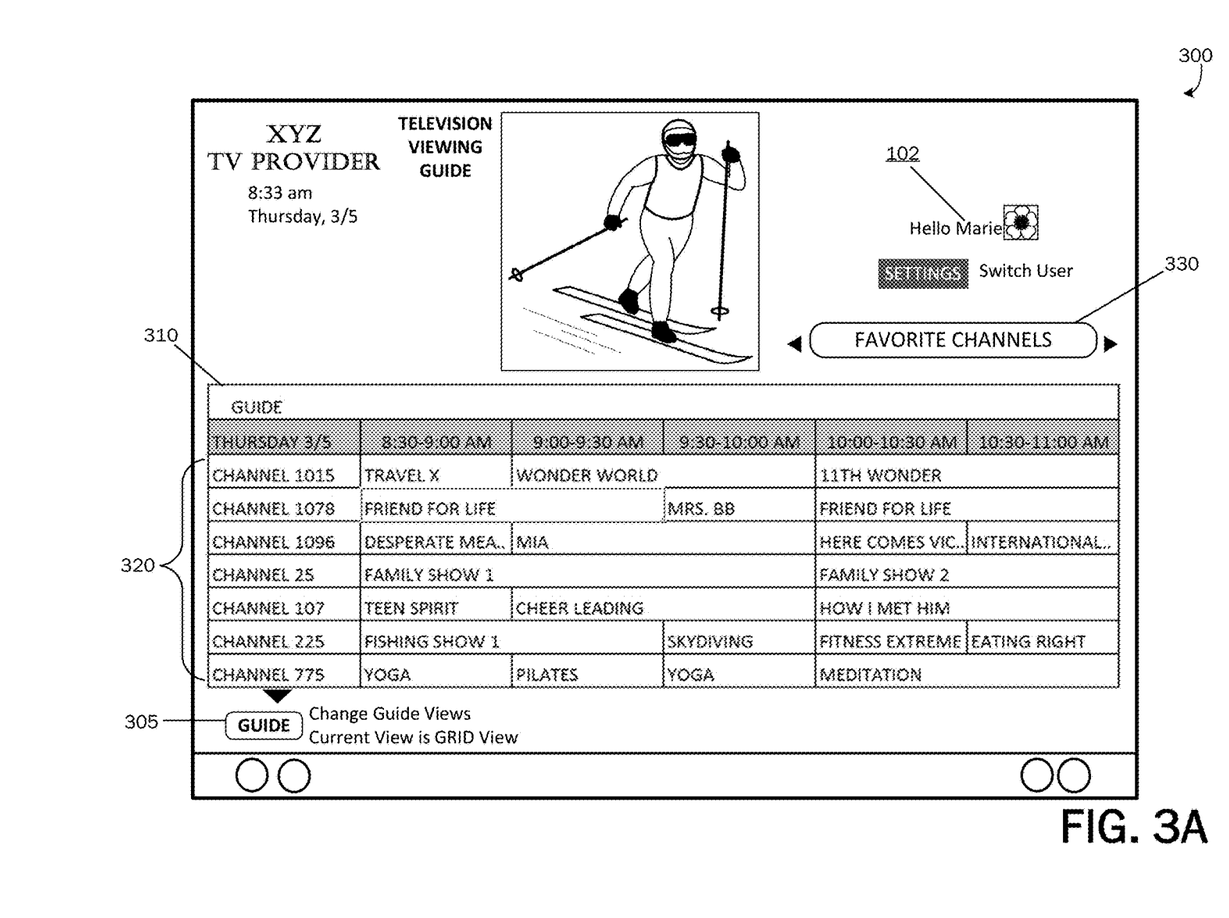
FIG. 3A is an illustration of an example personal programming guide comprising a user's favorite channels.

With reference now to FIG. 3A, an example personalized programming guide 300 is illustrated. The example personalized programming guide 300 illustrated in FIG. 3A is displayed in a grid view 310. As should be appreciated, the programming guide 300 that is illustrated is for purposes of example only. The personalized programming guide 300 may be displayed in other views, for example, a list view, or a mosaic view. As illustrated, a guide view option 305 may be provided, which when selected, may change the layout of the guide. For example, a user 102 may select the guide view option 305, and select to change the layout of the personalized programming guide 300 from a grid view 310 to a mosaic view. Accordingly, the display of the personalized programming guide 300 may be refreshed, and the content may be displayed in a mosaic format.

As described above, the personalized information collected by the client 104 from and on behalf of a user 102 may be processed and utilized to identify the user's most watched channels. The identified most watched channels for the user 102 may be automatically determined to be the user's favorite channels. When the user accesses the programming guide, the user's personalized programming guide 300 may automatically display content that is airing on his/her favorite channels 320, for example, as illustrated in FIG. 3A.

When the programming guide is launched, the user's personalized programming guide 300 may automatically open the user's favorite channels 320 list which, according to one embodiment, may be displayed within the full programming guide channel lineup, for example, with the user's favorite channels 320 displayed above the other channels. According to another embodiment, the user's favorite channels 320 may be displayed in separate screen, for example, in a favorite channels list screen as illustrated. The user 102 may be able to navigate to other screens within the personalized programming guide 300 via selection of a screen navigation control 330 displayed in the personalized programming guide 300 or via selection of a designated button or other selectable control on a remote control or other suitable hard or soft key selection used to initiate the user's request.

Figure 3B:
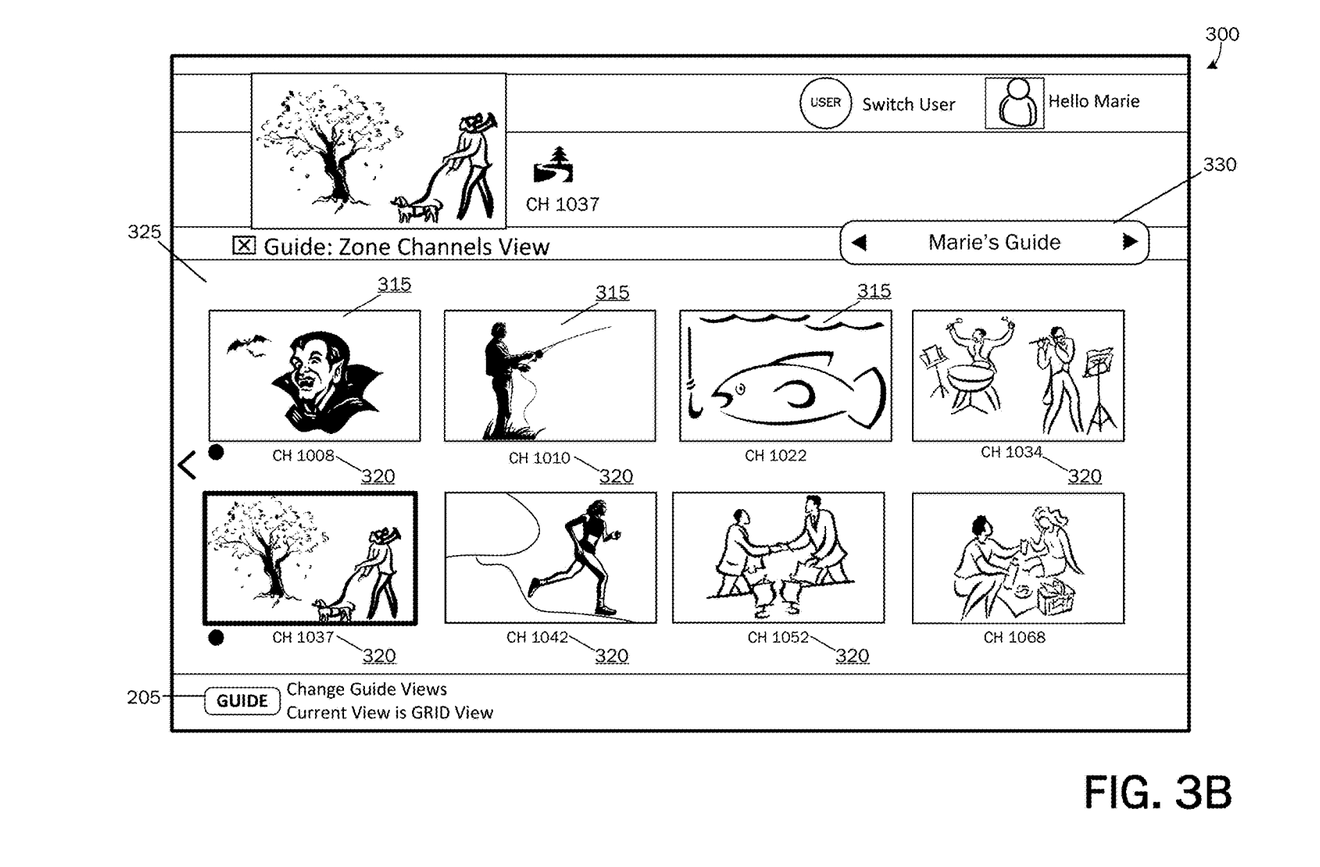
FIG. 3B is an illustration of an example personal programming guide comprising recommendations and content tied to a user's favorite channels and specified themes.

With reference now to FIG. 3B, an example personalized programming guide 300 is displayed in a mosaic view 325. The example personalized programming guide 300 illustrated in FIG. 3 comprises a display of recommendations and content tied to the user's favorite channels 320 (e.g., user-selected and automatically determined from the user's most-watched channels), specified or identified genres, and specified or identified themes 210. The content selected for display in the personalized programming guide 300 may include available content airing on the user's favorite channels 320, as well as recommended theme-related content 315 as determined by the database 108. As can be appreciated, some content may fall into multiple categories: content airing on the user's favorite channel 320, content that is determined to match a user-specified or system-identified theme 210 (i.e., theme-related content 315), and/or content associated with a user-selected or automatically-selected genre. According to an embodiment, the number of favorite channels displayed may be a total number of favorite channels 320, or may be a top "n" number of favorite channels, wherein "n" may be a predetermined number, a number selected by the user 102, or a variant number of channels meeting a predetermined threshold.

Figure 4:
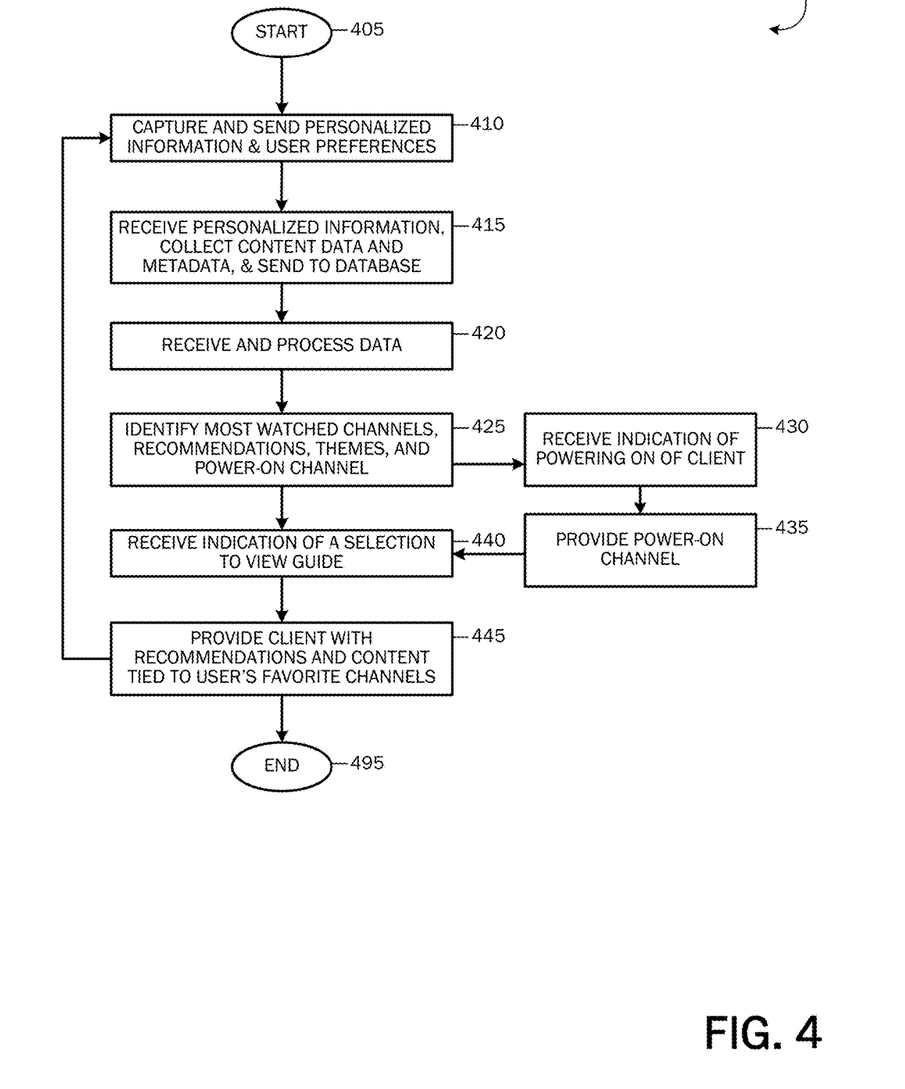
FIG. 4 is a is a high-level flowchart showing one embodiment of a method for generating and dynamically updating a personalized programming guide.

FIG. 4 is a flow chart of a method 400 for generating and dynamically updating a personalized programming guide 300. The method 400 begins at OPERATION 405 and proceeds to OPERATION 410 where personalized information may be captured by the client 104. As described above, the personalized information may include information such as which channels and programs the user 102 is watching. Personalized information may also include information such as what day of the week the user 102 is watching a certain channel or program, what time of the day the user 102 is watching a certain channel or program, and the type of client device the user 102 is using. Additionally, the user 102 may select preferences. For example, the user 102 may select preferred genres, themes 210, favorite channels 320, guide view preferences, etc. The captured information may be sent to the server 106.

The method 400 may then proceed to OPERATION 415, where the server 106 receives the personalized information and user preference data. The server may also collect data and metadata associated with available media content from the content server 110, the VOD server 112, and/or the DVR platform 114 as described above. The collected data and metadata may be shared with the database 108.

At OPERATION 420, the personalized information, user preference data, and data and metadata associated with available media content from the content server 110, the VOD server 112, and/or the DVR platform 114 may be processed.

At OPERATION 425, the user's most watched channels may be identified and designated as favorite channels 320. Additionally, one or more commonly-viewed themes 210 may be identified. Further, recommendations may be identified and a power-on channel may be selected. User-specified preferences and detected and/or user-selected themes 210 may be utilized to filter the recommendations, relevant content, and power-on channel. Various factors such as the day of the week, the time of the day, the client device type, etc., may also be used to filter recommendations, relevant content, and the power-on channel.

The method 400 may proceed to OPERATION 430 or OPERATION 440. At OPERATION 430, an indication of a powering on of a client 104 may be received. The client 104 may be one of various types of client devices and applications. For example, the user 102 may turn on his STB or launch a web application on a tablet device.

The method 400 may proceed from OPERATION 430 to OPERATION 435, and the client 104 may receive information identifying the user's power-on channel and may tune to the power-on channel for display to the user 102.

The method 400 may proceed from OPERATION 425 or OPERATION 435 to OPERATION 440, where an indication of a selection to view the programming guide is received. The user may select a menu option to view the guide, select a designated button or other selectable control on a remote control or other input device, or select a suitable client hard or soft key to initiate the request.

At OPERATION 445, the server 106 may provide the client 104 with recommendations and content tied to the user's favorite channels, specified genres, and specified themes 210, which may be displayed in the user's personalized programming guide 300 as described above.

The method may return to OPERATION 410, where additional personalized information is captured and/or user preference data is provided by the user 102. The captured and received information and data may be communicated to the database 108 via the server 106 for updating the user's personalized settings and dynamically updating the personalized programming guide 300. The method 400 may end at OPERATION 495.

Figure 5:
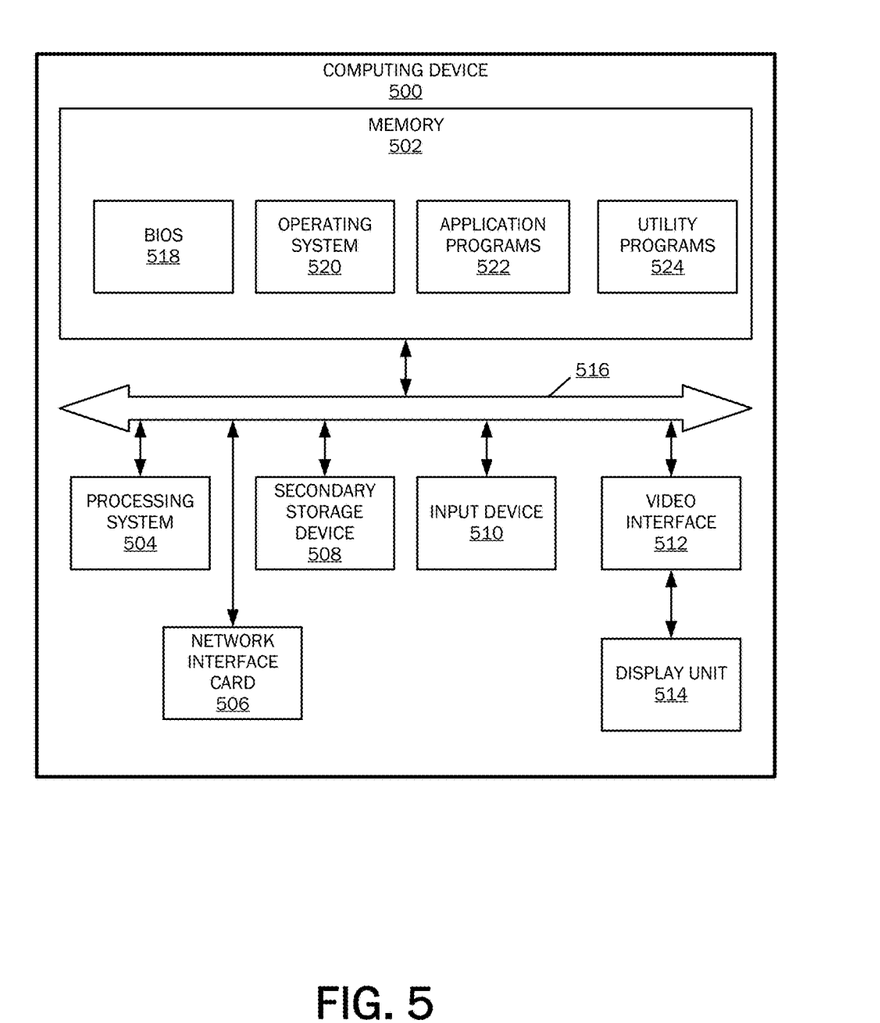
FIG. 5 is a simplified block diagram illustrating example physical components of a computing device with which embodiments of the system may be practiced.

FIG. 5 is a simplified block diagram illustrating example physical components of a computing device 500 with which embodiments of the system 100 may be practiced. In some embodiments, one or more of the components of system 100 may be implemented using one or more computing devices like the computing device 500. It should be appreciated that in other embodiments, components of system 100 may be implemented using computing devices having hardware components other than those illustrated in the illustrated embodiment.

Computing devices may be implemented in different ways in different embodiments. For instance, in the illustrated embodiment, the computing device 500 includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

Memory 502 and secondary storage device 508 may store computer-readable information, such as, but not limited to, computer-executable instructions (e.g., programs), data structures, and/or data. The processing system 504 may perform an I/O operation to retrieve the computer-readable information from the secondary storage device 508. According to one embodiment, any of the applications of the system 100 may be may be stored locally on computing device 500. Thus, memory 502 and/or secondary storage device 508 may store the computer-executable instructions that, when executed by processor 504, cause the system 100 to provide a personalized programming guide 300 as described above.

In various embodiments, memory 502 and secondary storage device 508 may be implemented as various types of computer-readable storage media. Computer-readable storage media broadly encompasses removable and non-removable devices, media, and other articles of manufacture, which may be implemented in various methods or technologies, providing for volatile or nonvolatile storage and retrieval of computer-readable information. As used herein, computer-readable media includes computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), magnetic disks, magnetic tape drives, CD-ROM discs, DVD-ROM discs, and Blu-Ray discs.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 510 enables the computing device 500 to receive input from a user. Example types of input devices include, but are not limited to, remote control devices, keyboards, mice, trackballs, stylus input devices, keypads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the illustrated embodiment, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 502 stores various types of data and/or software instructions. For instance, in the illustrated embodiment, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments of the present invention may be utilized in various distributed computing environments where tasks are performed by remote processing devices that are linked through a communications network in a distributed computing environment.

Figure 6A:
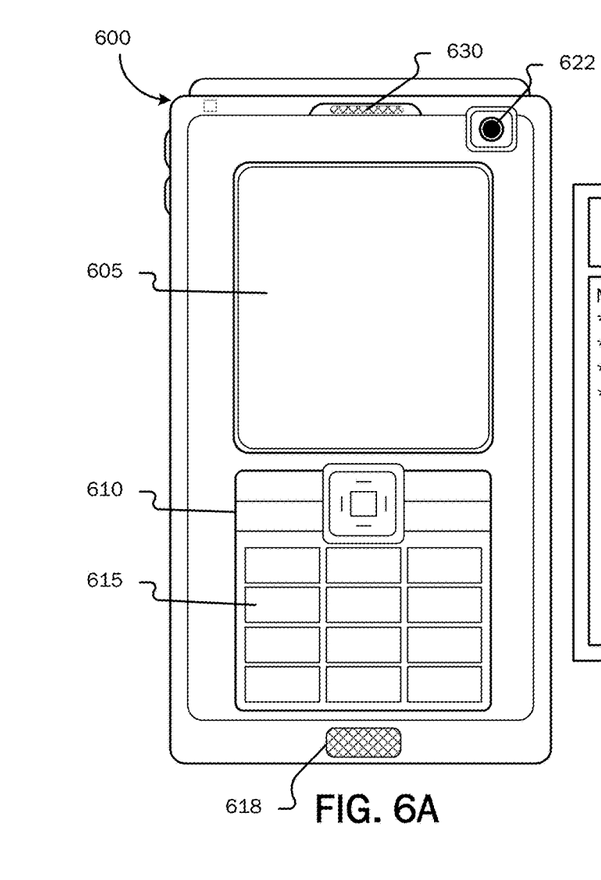
FIGS. 6A and 6B illustrate a suitable mobile computing environment with which embodiments of the system may be practiced.
Figure 6B:
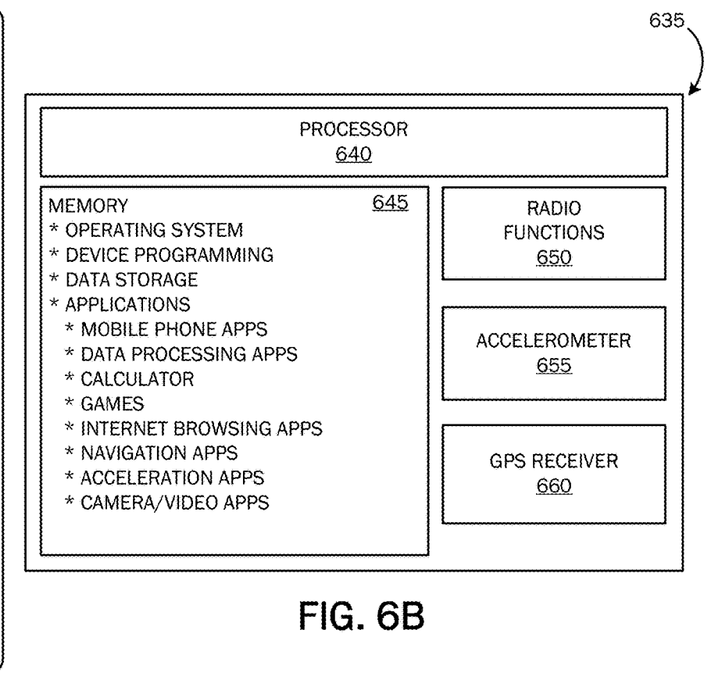

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 622 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to analyze the customization and storage may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or Wi-Fi based positioning system to determine a device's 600 location.

Figure 7:
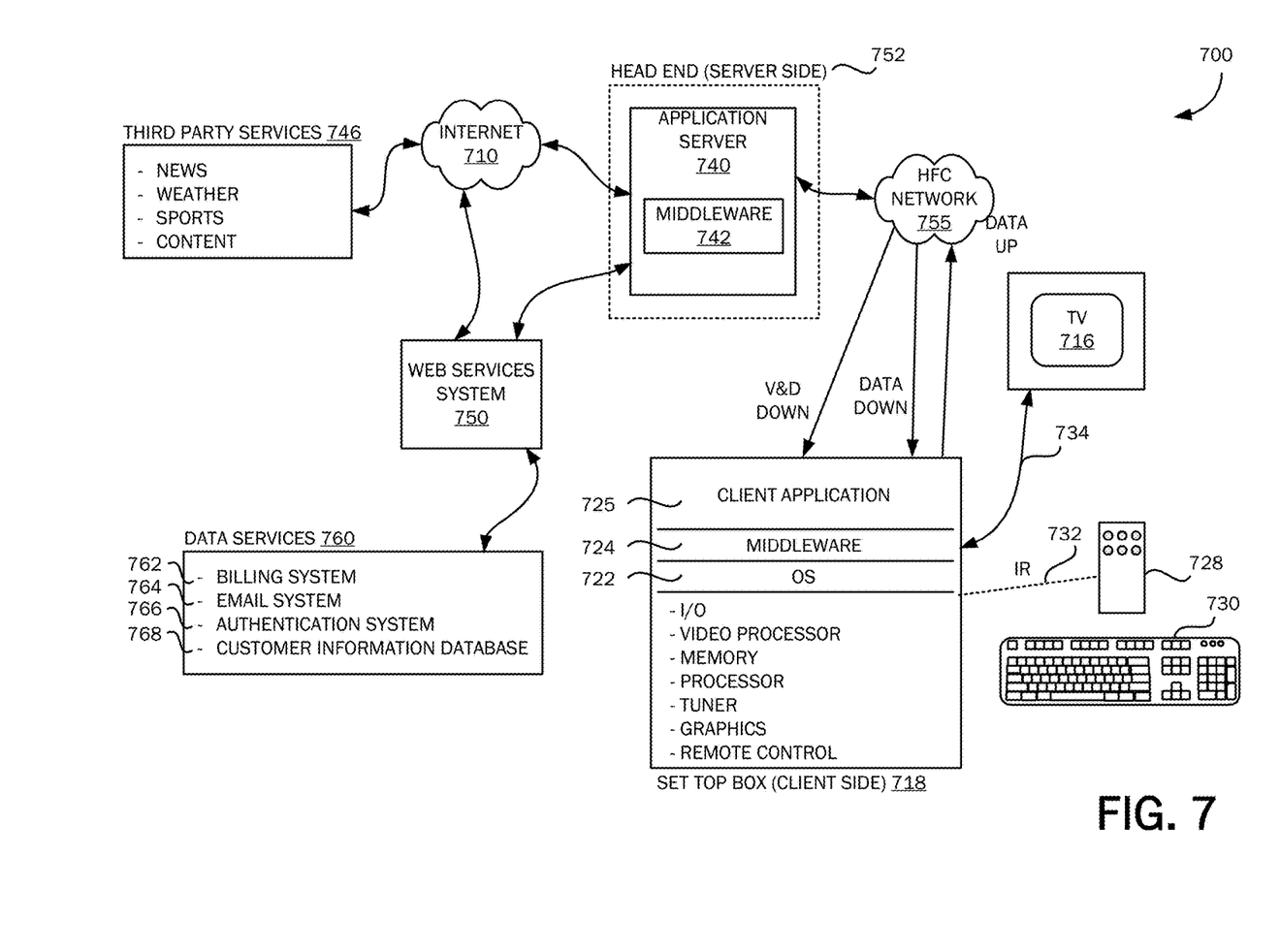
FIG. 7 is a simplified block diagram illustrating a cable television services system architecture providing an operating environment according to an embodiment.

FIG. 7 is a simplified block diagram illustrating a cable television services system 700 (hereafter referred to as "CATV") architecture providing an operating environment according to an embodiment. As can be appreciated, a CATV architecture is but one of various types of systems that may be utilized to provide substituted VOD content. Referring now to FIG. 7, digital and analog video programming, information content and interactive television services are provided via a hybrid fiber coax (HFC) network 755 to a television set 716 for consumption by a cable television/services system customer. As is known to those skilled in the art, HFC networks 755 combine both optical fiber and coaxial cable lines. Typically, optical fiber runs from the cable head end 752 to neighborhoods of subscribers. Coaxial cable runs from the optical fiber feeders to each customer or subscriber. The functionality of the HFC network 755 allows for efficient bidirectional data flow between the client-side set-top box 718 and a server-side application server 740.

The CATV system 700 is in the form of a distributed client-server computing system for providing video and data flow across the HFC network 755 between server-side services providers (e.g., cable television/services providers) via a server-side head end 752 and a client-side customer via a client-side set-top box (STB) 718 in communication with a customer receiving device, such as the television set 716. As is understood by those skilled in the art, modern CATV systems 700 may provide a variety of services across the HFC network 755 including traditional digital and analog video programming, telephone services, high speed Internet access, video-on-demand, and information services.

On the client side of the CATV system 700, digital and analog video programming and digital and analog data are provided to the customer television set 716 via the set-top box (STB) 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 755 and from customers via input devices such as the remote control device 728, keyboard 730, or other computing device, such as a tablet/slate computer, smart phone, etc. The remote control device 728 and the keyboard 730 may communicate with the STB 718 via a suitable communication transport such as the infrared connection 732. The STB 718 also includes a video processor for processing and providing digital and analog video signaling to the television set 716 via a cable communication transport 734. A multi-channel tuner is provided for processing video and data to and from the STB 718 and the server-side head end system 752, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 may cause the graphics functionality and video processor of the STB 718, for example, to output the news flash to the television 716 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 718. The middleware layer 742 of the server-side application server and the middleware layer 724 of the client-side STB 718 may format data passed between the client side and server side according to the Extensible Markup Language (XML).

According to one embodiment, the set-top box 718 passes digital and analog video and data signaling to the television 716 via a one-way communication transport 734. According to other embodiments, two-way communication transports may be utilized, for example, via high definition multimedia (HDMI) ports. The STB 718 may receive video and data from the server side of the CATV system 700 via the HFC network 755 through a video/data downlink and data via a data downlink. The STB 718 may transmit data from the client side of the CATV system 700 to the server side of the CATV system 700 via the HFC network 755 via one data uplink. The video/data downlink is an "in band" downlink that allows for digital and analog video and data signaling from the server side of the CATV system 700 through the HFC network 755 to the set-top box 718 for use by the STB 718 and for distribution to the television set 716. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 755 and the set-top box 718 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 718 and the server-side application server 740 is typically passed through the "out of band" data links. Alternatively, an "in band" data carousel may be positioned in an "in band" channel into which a data feed may be processed from the server-side application server 740 through the HFC network 755 to the client-side STB 718. Operation of data transport between components of the CATV system 700, described with reference to FIG. 7, is well known to those skilled in the art.

Referring still to FIG. 7, the head end 752 of the CATV system 700 is positioned on the server side of the CATV system and includes hardware and software systems responsible for originating and managing content for distributing through the HFC network 755 to client-side STBs 718 for presentation to customers via television sets 716. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 718 via the HFC network 755. As described above with reference to the set-top box 718, the application server 740 includes a middleware layer 742 for processing and preparing data from the head end of the CATV system 700 for receipt and use by the client-side set-top box 718. For example, the application server 740 via the middleware layer 742 may obtain data from third-party services 746 via the Internet 710 for transmitting to a customer through the HFC network 755 and the set-top-box 718. For example, content metadata of a third-party content provider service may be downloaded by the application server 740 via the Internet 710. When the application server 740 receives the downloaded content metadata, the middleware layer 742 may be utilized to format the content metadata for receipt and use by the set-top box 718. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 718 through the HFC network 755 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 710 for provision to customers via the HFC network 755 and the set-top box 718.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for providing a personalized programming guide, the method comprising:
   providing video across a network to a set-top box and a program guide of scheduled content;
   using the program guide to search content and to select one or more channels a user wants to watch via the set-top box;
   receiving personalized information associated with a user's viewing activity of video associated with the one or more channels;
   processing the personalized information collected by the set-top box;
   identifying one or more most frequently watched channels from the personalized information;
   defining the one or more most frequently watched channels as the user's favorite channels; and
   upon receiving an indication of a selection to view the programming guide, personalizing the program guide by updating the program guide to display together in a first screen the user's favorite channels identified as favorites along with other channels; and
   while displaying the favorite channels identified as favorites and the other channels together in the first screen of the personalized program guide, receiving an indication in the first screen of a selection to navigate to a separate second screen of the programming guide to display a top number of the favorite channels selected by the user as a list without the other channels.

2. The method of claim 1, wherein receiving personalized information associated with a user's viewing activity comprises receiving one or more of:
   which channels and programs the user is watching;
   a day of the week the user is watching a certain channel or program;
   a time of day the user is watching a certain channel or program; or
   a type of client device the user is using to watch a certain channel or program.

3. The method of claim 2, wherein providing the user's favorite channels for display in the personalized programming guide comprises providing the user's favorite channels for display in the guide according to one or more of:
   a day of the week;
   a time of the day;
   a type of client device via which the user selects to view the personalized programming guide; or
   a type of client device via which the user selects to watch a channel defined as a favorite channel.

4. The method of claim 1, further comprising:
   determining one or more content recommendations for the user;
   identifying one or more frequently viewed themes;
   filtering the one or more content recommendations for the user based on the one or more frequently viewed themes; and
   providing one or more theme filtered content recommendations for display in the personalized programming guide.

5. The method of claim 4, wherein the one or more content recommendations comprise content that is available on the user's favorite channels.

6. The method of claim 4, wherein prior to filtering the one or more content recommendations for the user based on the one or more frequently viewed themes, receiving an indication of a selection by the user to add the one or more frequently viewed themes to the user's personalized information.

7. The method of claim 1, further comprising:
   defining a power-on channel;
   receiving an indication of a powering on of a client viewing device; and
   providing the power-on channel such that the client viewing device is first tuned to the power-on channel for display.

8. The method of claim 7, wherein defining a power-on channel comprises one or more of:
   identifying the user's most watched channel and defining the user's most watched channel as the power-on channel;
   identifying a channel most watched at a specific day and time and defining the channel most watched at the specific day and time as the power-on channel for the specific day and time; or
   identifying a channel most watched on a particular client viewing device and defining the channel most watched on the particular client viewing device as the power-on channel for the specific viewing device.

9. A system for providing a personalized programming guide, the system comprising:
   a memory storage; and
   one or more processing units coupled to the memory storage, wherein the processing unit(s) are operable to:
   receive personalized information associated with a user's viewing activity;
   process the personalized information;
   identify one or more most frequently watched channels;
   define the one or more most frequently watched channels as the user's favorite channels;
   determine one or more content recommendations for the user;
   receive an indication of a selection to view the personalized programming guide;
   provide the user's favorite channels identified as favorites for display in the personalized programming guide in a first screen along with other channels, and wherein upon receipt of a selection in the first screen to navigate from the first screen of the personalized program guide display in a second screen a list of a top number of the favorite channels selected by the user without the other channels; and
   provide the one or more content recommendations for display in the personalized programming guide.

10. The system of claim 9, wherein the one or more content recommendations comprise content that is available on the user's favorite channels.

11. The system of claim 9, wherein in receiving personalized information associated with a user's viewing activity, the one or more processors are operable to receive one or more of:
   which channels and programs the user is watching;
   a day of the week the user is watching a certain channel or program;
   a time of day the user is watching a certain channel or program; or
   a type of client device the user is using to watch a certain channel or program.

12. The system of claim 11, wherein in providing the user's favorite channels for display in the personalized programming guide, the one or more processors are operable to provide the user's favorite channels for display in the guide according to one or more of:
   a day of the week;
   a time of the day; or
   a type of client device via which the user selects to view the personalized programming guide.

13. The system of claim 9, wherein the one or more processors are further operable to:
   identify one or more frequently viewed themes;
   filter the one or more content recommendations for the user based on the one or more frequently viewed themes; and
   provide one or more theme filtered content recommendations for display in the personalized programming guide.

14. The system of claim 9, wherein the one or more processors are further operable to:
   identify the user's most watched channel;
   define a power-on channel;
   receive an indication of a powering on of a client viewing device; and
   provide the power-on channel such that the client viewing device is first tuned to the power-on channel for display.

15. The system of claim 14, wherein in defining the power-on channel, the one or more processors are further operable to:
   identify the user's most watched channel and defining the user's most watched channel as the power-on channel;
   identify a channel most watched at a specific day and time and defining the channel most watched at the specific day and time as the power-on channel for the specific day and time; or identify a channel most watched on a particular client viewing device and defining the channel most watched on the particular client viewing device as the power-on channel for the specific viewing device.

16. A computer-readable storage device having stored thereon computer-executable instructions which when executed by a computer perform a method for providing a personalized programming guide, comprising:

receiving personalized information associated with a user's viewing activity;

processing the personalized information;

identifying one or more most frequently watched channels;

defining the one or more most frequently watched channels as the user's favorite channels;

determining one or more content recommendations for the user;

identifying one or more frequently viewed themes;

filtering the one or more content recommendations for the user based on the one or more frequently viewed themes;

receiving an indication of a selection to view the personalized programming guide;

providing the user's favorite channels identified as favorites for display in a first screen of the personalized programming guide along with other channels;

while displaying the favorite channels in the first screen and the other channels together in the first screen of the personalized program guide, receiving an indication of a selection in the first screen to navigate to a separate second screen of the programming guide to display a top number of the favorite channels selected by the user as a list without the other channels.

17. The computer-readable storage device of claim 16:

wherein receiving personalized information associated with a user's viewing activity comprises receiving one or more of:

which channels and programs the user is watching;

a day of the week the user is watching a certain channel or program;

a time of day the user is watching a certain channel or program; or a type of client device the user is using to watch a certain channel or program; and wherein providing the user's favorite channels for display in the personalized programming guide comprises providing the user's favorite channels for display in the guide according to one or more of:

a day of the week;

a time of the day;

a type of client device via which the user selects to view the personalized programming guide.

18. The computer-readable storage device of claim 16, further comprising:

defining a power-on channel, wherein defining the power-on channel comprises one or more of:

identifying the user's most watched channel and defining the user's most watched channel as the power-on channel;

identifying a channel most watched at a specific day and time and defining the channel most watched at the specific day and time as the power-on channel for the specific day and time; or identifying a channel most watched on a particular client viewing device and defining the channel most watched on the particular client viewing device as the power-on channel for the specific viewing device;

receiving an indication of a powering on of a client viewing device; and providing the power-on channel such that the client viewing device is first tuned to the power-on channel for display.

* * * * *